Nov. 4, 1969    J. D. DUNFEE    3,476,444

HYDROSTATIC BEARING UNIT

Filed April 4, 1968

INVENTOR.
JAME D. DUNFEE

BY

ATTORNEY

United States Patent Office 3,476,444
Patented Nov. 4, 1969

3,476,444
HYDROSTATIC BEARING UNIT
James D. Dunfee, 6328 Crafton St.,
Philadelphia, Pa. 19140
Filed Apr. 4, 1968, Ser. No. 718,857
Int. Cl. F16c 29/00, 29/02, 33/00
U.S. Cl. 308—3.5                            4 Claims

ABSTRACT OF THE DISCLOSURE

A modular hydrostatic bearing unit is disclosed which is adapted for connection to an externally pressurized fluid supply and a fluid return line. The bearing has internal fluid passages for connection with the supply and return lines together with an air fluid seal to prevent the escape of the fluid. The module units are so constructed that they may be used as a single bearing unit and may also be assembled into a plurality of mated bearing units.

BACKGROUND OF THE INVENTION

*Field of the invention.*—This invention pertains to way bearings and more particularly to a hydrostatic bearing unit for use on the ways of machines and in similar applications.

*Description of the prior art.*—In the past, recirculating roller bearings, such as described in the patents to Better, No. 3,246,893 and Kalmanek No. 3,341,262, have been commonly used as way bearings in large machines having a heavy carriage reciprocably movable along ways, or machines in which large or heavy parts reciprocate to each other. The commercial success of this type bearing is largely due to the fact that they are self-contained units, available from stock in standard sizes, and simple to mount. These factors override the minor disadvantage of the roller bearing which include the restriction of movement to only one direction and the necessity to have hardened and precision ways on which the bearings operate. In addition, there is some wear of the way surface due to the metal-to-metal contact of the bearing elements and the way. The precise adjustment of the carriage in these instances is difficult due to the static friction involved between the carriage supporting bearing and the way surface because the force required to overcome the static friction often results in a movement of the carriage beyond the desired position, due to the fact that the frictional resistance decreases with movement of the carriage.

The use of hydrostatic bearings to move the carriage of the machine tool while floating on a hydrostatic cushion or pad of fluid is already known. The use of the hydrostatic bearings eliminates the disadvantages of the roller bearings previously described. However, to the present time the hydrostatic bearings have been made an integral part of the carriage. There has been no hydrostatic bearing readily available to the market as a self-contained unit, available from stock in standard sizes, and simple to mount, as is present with the roller bearing units.

It has long been desired to have a commercially available bearing having the advantageous features of the roller bearing in the hydrostatic bearing while eliminating disadvantages of both bearings.

SUMMARY OF THE INVENTION

A hydrostatic bearing unit is provided essentially as a self-contained unit which may be used as a single unit and is adapted for multiple ganged unit use. The bearing unit comprises a module in which the load supporting surface normally has a hydrostatic pad recess, a fluid return groove and may also include an air seal formed therein. A fluid supply passage, a fluid return passage, and an air supply passage extend through said module, opening at opposite ends thereof, and have passages connected respectively to the pad recess, return groove, and air seal. The modules may be used singularly and may also be mated together end-to-end for multiple module configuration without further manifolding or conduits.

Applicant has provided a substantially self-contained hydrostatic bearing unit commensurate in size with that of the roller bearings units. Applicant's bearings provide a friction-free motion with the total elimination of static friction and assures a smooth motion under load. The motion is not restricted to one direction only since the hydrostatic unit can move in any direction in the plane of the bearing surface. The use of fluid film improves the positioning accuracy and eliminates wear on the way surface since there is no metal-to-metal contact. Each unit is simple to mount and may be readily assembled into a single system made up of multiple hydrostatic pad units mated together. The hardened and precision ground ways necessary for other types of roller bearings are not required with applicant's hydrostatic bearing and cast iron milled surfaces have been found satisfactory for precision operation.

DESCRIPTION OF THE DRAWINGS

An illustrative embodiment of the present invention is shown in the following drawings, in which—

DETAILED DESCRIPTION OF THE INVENTION

Figure 1:
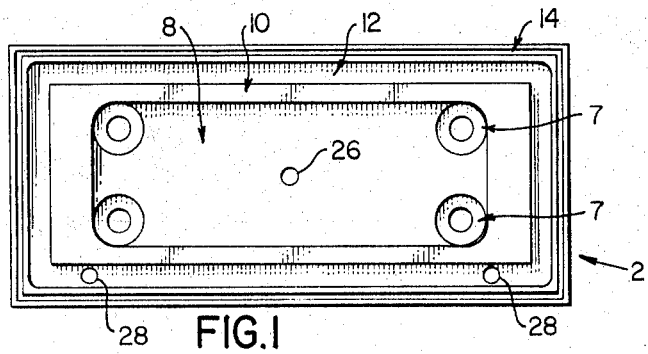
FIG. 1 is a bottom view of the hydrostatic bearing unit.
Figure 2:
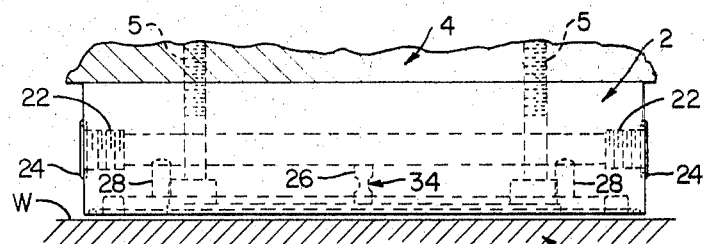
FIG. 2 is a side view of the bearing unit.
Figure 3:
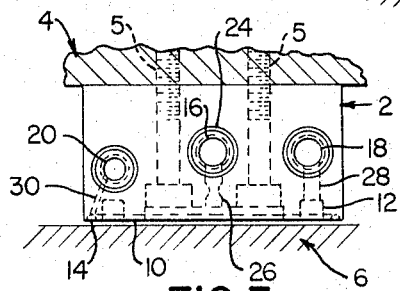
FIG. 3 is an end view of the hydrostatic bearing unit.

Referring to the drawings of the illustrative embodiment of the present invention, a bearing module unit 2 is mounted on a carriage 4 for reciprocal movement along a base 6 having a way surface designated as W. The bearing unit is mounted to carriage 4 by bolts 5 or similar means extending through bolt holes 7, having a counterbore for sealing purposes, which are provided in hydrostatic pad recess 8 which is formed in the load supporting surface of the unit.

A sill area or land 10 surrounds the pad recess 8 and a first channel or groove 12 extends around the sill area. A second channel or groove 14, of lesser depth than channel 12, extends around the first channel.

Passages 16, 18 and 20, extends through the bearing unit 2 and open in opposing end walls of the unit. The walls have substantially parallel outer surfaces which are arranged to mate, in a manner to be described herebelow, with cooperating wall surfaces of adjoining bearing units when mounted for multiple ganged unit use. Each passage has a threaded port 22 with an auxiliary O ring seal groove formed therein at each end of the respective passages, the purposes of which will be explained below. Passage 16 communicates with pad recess 8 through a passage 26 while passage 18 is in communication with the first channel 12 through the passage 28 and passage 20 communicates with the second channel 14 through passage 30.

Figure 4:
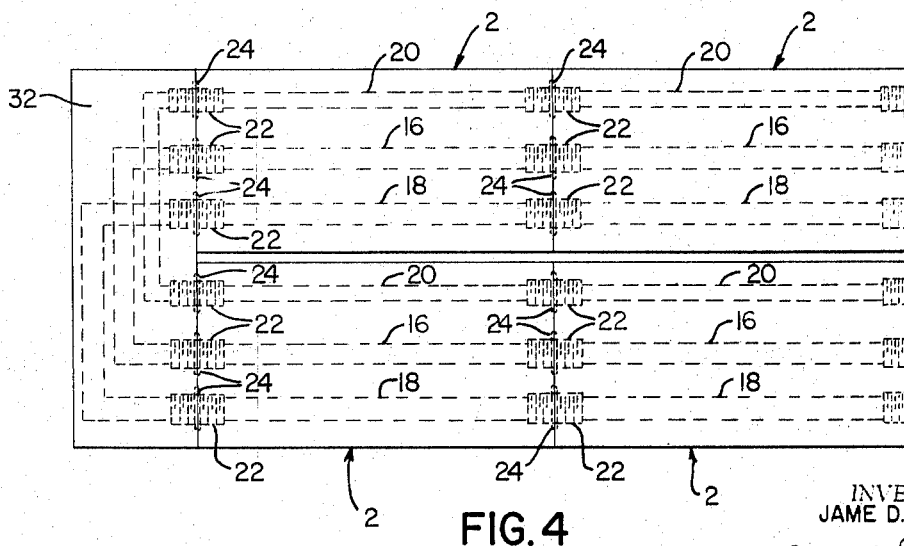
FIG. 4 is a schematic representation of the hydrostatic bearing units mated for multiple ganged unit use and side-by-side use.

In operation, pressurized fluid from a pump, not shown, is provided to supply passage 16. It should be noted that the pressurized fluid used in hydrostatic bearings may be a liquid, such as oil, or the fluid may be air. Thus, if only one bearing unit is used, it is necessary only to place a standard tubing fitting in port 22 in one end of the unit for the fluid supply line and a standard plug fitting in the opposite end of passage 16. Similar fittings are used for passages 18 and 20. If two or more bearing units are to be used they will be butted together with the O-rings in place to form a fluid seal and no additional tubing is required. Passages 16, 18 and 20 of one bearing unit are in a cooperative mating relationship with corresponding passages of another unit when the units are butted end-to-end and the O-rings 24 prevent the escape of fluid. If it is desirable to mount the hydrostatic bearing units side-by-side as well as end-to-end, a simple drilled manifold plate 32, as seen in the schematic of FIG. 4, mounted on the ends of the units would suffice.

Fluid from passage 16 flows through passage 26 to the hydrostatic pad recess 8 forming the hydrostatic bearing with the supporting features well known in the art. Passage 26 acts as a hydraulic restrictor between the supply passage 16 and the pad recess 8 for maintaining the desired pressures in the recess area, however, a restrictor such as illustrated at 34 may be physically located within passage 26 if needed. Fluid from pad 8 will flow across sill 10 and be collected in channel 12 for return to a reservoir through the fluid return passage 18. An air supply is connected to passage 20 and flows through passage 30 to channel 14. This air will then blow away chips and debris from the bearing vicinity and will also enter the drainage groove 12 to help seal in the oil and also help recover some of the oil.

It can thus be seen that applicant has provided a compact, substantially self-contained bearing unit combining the desirable features of the rolling bearing units and the hydrostatic bearing equipment. The hydrostatic bearing unit described will provide a designer and manufacturer of machine tools and other linear motion equipment the capability of realizing the advantages of hydrostatic lubrication from the use of bearing units which are available from stock in standard sizes and are simple to mount and can be used as a single unit and mated together for multiple ganged unit use.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A hydrostatic bearing unit adapted for single and multiple ganged unit use comprising:
    a bearing module including
        a pair of opposed end wall surfaces and a load supporting surface, said load supporting surface having a hydrostatic pad recess area, a sill area thereabout, and a return channel around said sill area formed therein,
    a fluid supply passage extending through said module and opening at opposite ends in said opposed wall surfaces,
    first passage means in said module for communication between said fluid supply passage and said pad recess area,
    a fluid return passage extending through said module and opening at opposite ends in opposed wall surfaces,
    second passage means in said module for communication between said fluid return passage and said return channel,
    and port means associated with each of said passage openings wherein said openings at one end of said module may be respectively connected to a fluid supply line and a fluid return line and the port means at the opposite end of said bearing module may be closed for single bearing use and a plurality of said modules may be readily assembled into an operating assembly wherein similar wall surfaces and port means are placed in a cooperative mating relationship.

2. A hydrostatic bearing unit as set forth in claim 1 further comprising,
    seal means extending around said return channel wherein fluid is prevented from escaping from said return channel whereby fluid flowing from said pad recess to said return channel is collected for transmission to said fluid return passage.

3. A hydrostatic bearing unit adapted for single and multiple ganged unit use comprising:
    a bearing module including a pair of opposed end wall surfaces and a load supporting surface, said load supporting surface having formed therein
        a liquid pad recess area,
        a sill area around said pad area,
        a first channel around said sill area,
        a second channel around said first channel,
    a liquid supply passage extending through said module and opening at opposite ends in said opposed wall surfaces,
    first passage means in said module for communication between said liquid supply passage and said recess area wherein pressurized liquid is supplied to said recess area,
    a liquid return passage extending through said module and opening at opposite ends in said opposed wall surfaces,
    second passage means in said module for communication between said first channel and said return passage wherein liquid flowing over said sill area into said first channel will be transmitted to said return passage,
    an air supply passage extending through said module and opening at opposite ends in said opposed wall surfaces,
    third passage means in said module for communication between said second channel and said air supply passage wherein air is supplied to said second channel forming an air seal therein and preventing escape of liquid from said first channel,
    port means associated with each of said passage openings in said wall surfaces,
    each said port means at one end of said module being connected respectively to a liquid supply line, a liquid return line and an air supply line, and
    each of said port means at the opposite end being closed for single bearing use and a plurality of said modules may be readily assembled into an operating assembly wherein similar wall surfaces and port means are placed in a cooperative mating relationship for multiple ganged bearing use.

4. A module forming the major component of a self-contained hydrostatic bearing unit, said module being adapted for multiple unit coupling and connection to a fluid supply and a fluid return means, said hydrostatic bearing unit comprising;
    a bearing module including substantially parallel wall surfaces and top and bottom surfaces, one of said top or bottom surfaces having a hydrostatic pad recess, a sill area therein, and a return channel,
    a fluid supply passage extending through said module and opening at opposite ends in opposed wall surfaces thereof for mating relationships at each end with adjoining modules,
    a fluid return passage extending through said module and opening at opposite ends in opposed wall surfaces thereof for mating relationships at each end with adjoining modules,
    first passage means in said module for communication between said fluid supply passage and said pad recess area,
    second passage means in said module for communication between said fluid return passage and said return channel, and port means associated with each of said passage openings wherein said openings at one end of said module may be respectively connected to a fluid supply line and a fluid return line and the port means at the opposite end of said bearing module may be closed for single bearing use and a plurality of said modules may be readily assembled into an operating assembly wherein similar wall surfaces and port means are placed in a cooperative mating relationship.

References Cited

UNITED STATES PATENTS

| | | | |
|---|---|---|---|
| 3,208,270 | 9/1965 | Hill | 305—5 X |
| 3,231,319 | 1/1966 | Porath | 308—5 |
| 3,355,990 | 12/1967 | Thum | 308—5 |
| 3,368,850 | 2/1968 | Wilcox | 308—5 |
| 3,384,425 | 5/1968 | Brown | 308—5 |
| 3,395,947 | 8/1968 | Brown | 308—5 |
| 3,410,176 | 11/1968 | Van Straaten | 308—5 X |

MARTIN P. SCHWADRON, Primary Examiner

L. L. JOHNSON, Assistant Examiner

U.S. Cl. X.R.

308—5

UNITED STATES PATENT OFFICE
CERTIFICATE OF CORRECTION

Patent No. 3,476,444                                    November 4, 1969

James D. Dunfee

It is certified that error appears in the above identified patent and that said Letters Patent are hereby corrected as shown below:

In the heading to the printed specification, lines 3 and 4, "James D. Dunfee, 6328 Crafton St., Philadelphia, Pa. 19140" should read -- James D. Dunfee, Philadelphia, Pa., assignor, by mesne assignments, to Scully-Jones Company, Chicago, Ill., a corporation of Delaware --.

Signed and sealed this 17th day of November 1970.

(SEAL)
Attest:

Edward M. Fletcher, Jr.                            WILLIAM E. SCHUYLER, JR.

Attesting Officer                                        Commissioner of Patents